(12) United States Patent
Stine

(10) Patent No.: US 6,466,827 B1
(45) Date of Patent: Oct. 15, 2002

(54) INDUSTRIAL CONTROL SYSTEM EMPLOYING RELAY LADDER OBJECTS

(75) Inventor: Douglas L. Stine, Hartland, WI (US)

(73) Assignee: Repete Corporation, Sussex, WI (US)

( * ) Notice: Subject to any disclaimer, the term of this patent is extended or adjusted under 35 U.S.C. 154(b) by 0 days.

(21) Appl. No.: 09/507,058

(22) Filed: Feb. 21, 2000

Related U.S. Application Data

(60) Provisional application No. 60/121,148, filed on Feb. 22, 1999.

(51) Int. Cl.[7] .......................... G05B 19/42; G05B 11/01
(52) U.S. Cl. ........................ 700/18; 700/86; 700/103
(58) Field of Search ........................ 700/17, 18, 20, 700/23, 25, 83, 86, 97, 103, 104; 712/32; 717/109; 345/967

(56) References Cited

U.S. PATENT DOCUMENTS

| | | | | |
|---|---|---|---|---|
| 5,530,643 A | * | 6/1996 | Hodorowski | 364/191 |
| 5,689,415 A | | 11/1997 | Calotychos et al. | 364/172 |
| 5,796,603 A | * | 8/1998 | Hodorowski | 364/131 |
| 5,812,394 A | | 9/1998 | Lewis et al. | 364/146 |
| 5,845,149 A | * | 12/1998 | Husted et al. | 395/829 |
| 5,896,289 A | * | 4/1999 | Struger | 364/138 |
| 6,076,020 A | * | 6/2000 | Schwenke et al. | 700/18 |
| 6,154,684 A | * | 11/2000 | Schwenke et al. | 700/159 |

\* cited by examiner

Primary Examiner—Paul P. Gordon
(74) Attorney, Agent, or Firm—Quarles & Brady LLP

(57) ABSTRACT

Rapid development of control programs for programmable logic controllers controlling semi-standard combinations of equipment is provided by the creation of relay ladder logic objects prestored in the programmable logic controller and invoked only as needed for the particular application. The inability of a programmable logic controller to provide for the memory management mechanisms necessary for true software object instancing is overcome by pre-storing the objects in the programmable controller with pre-allocated variable addresses. Connection of the used objects to I/O is provided by a mapper program also written in relay ladder code. The objects are associated with particular pieces of equipment and provide inter-machine control for that equipment while high level control program executed on a standard computer which controls the objects through reading and writing of object variables.

18 Claims, 3 Drawing Sheets

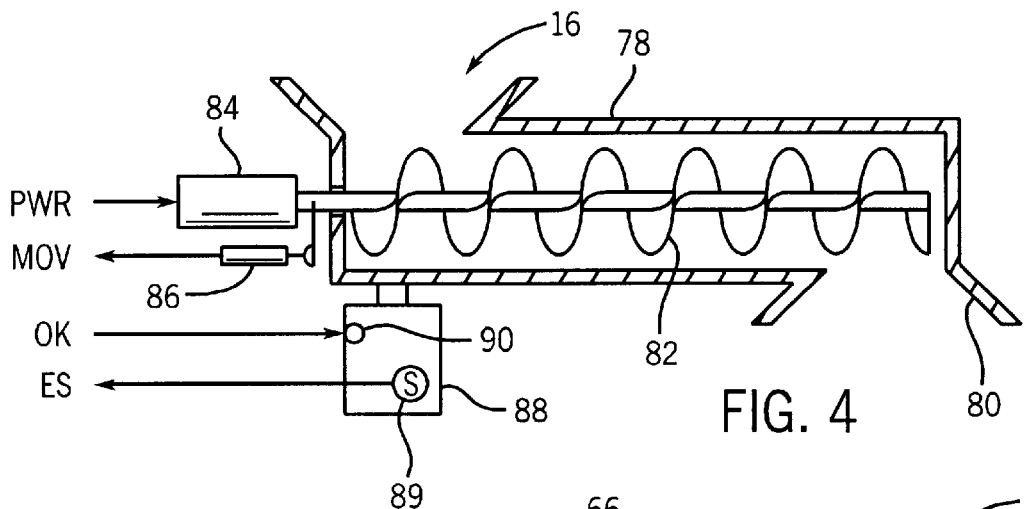
FIG. 4
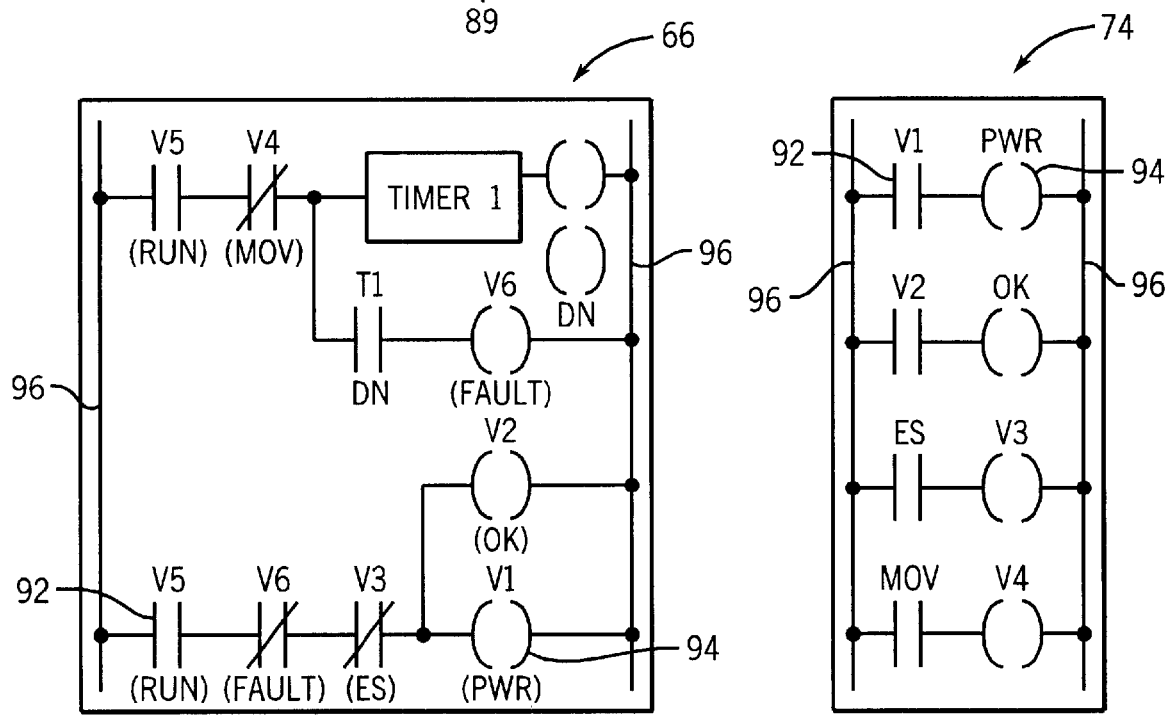
FIG. 5
FIG. 6
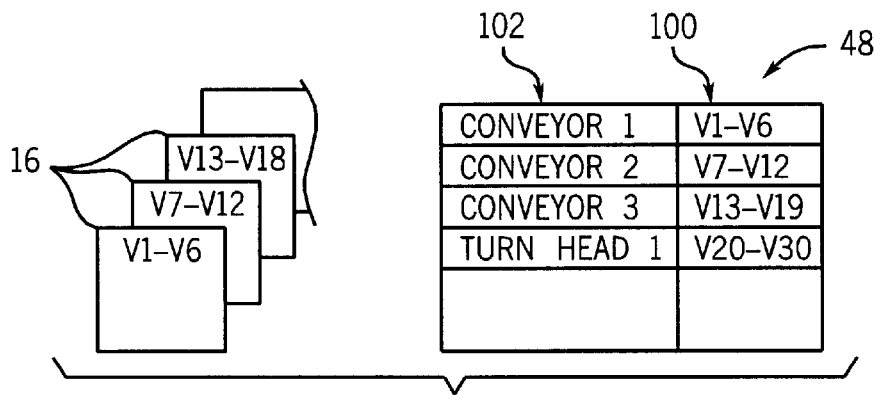
FIG. 7

INDUSTRIAL CONTROL SYSTEM EMPLOYING RELAY LADDER OBJECTS

CROSS-REFERENCE TO RELATED APPLICATIONS

This application is based on and claims the benefit of provisional application 60/121,148 filed Feb. 22, 1999, which is hereby incorporated by reference.

STATEMENT REGARDING FEDERALLY SPONSORED RESEARCH OR DEVELOPMENT

BACKGROUND OF THE INVENTION

The present invention relates to industrial control and in particular to an industrial controller providing preconfigured relay ladder "objects" that may be invoked by a standard computer system.

Industrial control systems are special purpose computers used for the control of industrial equipment and the like. Generally, an industrial controller executes a program to read inputs from sensors of a controlled process and, based on these inputs and the logic of a stored control program, to write outputs to actuators of the controlled process.

Industrial controllers differ from conventional computers in a number of respects. First, industrial computers are called upon to collect and process large amounts of input and output data having differing electrical characteristics at separated locations about a factory or the like. For this reason, they are typically constructed in a highly modular fashion to allow different numbers and types of input/output (I/O) modules to be assembled together depending on the requirements of the control task. Such I/O modules may include digital I/O modules conveying a single bit of binary information or analog modules providing voltage or currents within a range determined by a binary word. Many more sophisticated I/O modules are also available as is well understood in the art.

In addition, unlike standard computer systems, industrial controllers must control complex physical processes. This requires not only rapid execution of control logic instructions so as to approximate real time, but also a predictable execution of those instructions which is not affected by minor timing variations between the execution of the program and physical process. Speed and predictability can be obtained through the use of specialized control languages and circuitry for executing such languages. One example is relay ladder language in which the instructions are represented as virtual rungs of a relay ladder. The rungs have "contacts" representing input data and "coils" representing output data and are executed repeatedly in sequence from the top of the ladder to the bottom. Separate scanning hardware updates the data values of the contacts and coils in a predictable way.

Industrial controllers also differ from standard computers in that they must be extremely reliable. The hardware used for industrial controllers is designed to provide greater redundancy and error checking as well as to be physically robust against extreme environmental conditions of temperature extremes, dust and electromagnetic interference.

The control programs written for use on an industrial controller are usually unique to the particular control application. For this reason, and because programming represents a significant cost in preparing a control system, it would be highly desirable to simplify the programming process.

In standard computers, simplification of programming has led to the development of object oriented languages in which software objects are created that may be reused or duplicated (through the processes of "instancing" or "inheritance") to generate larger more complex programs. Each duplication of an object uses a template of a program of the object to allocate a new set of variables for the object and memory space for the object's execution as needed without necessarily duplicating the instructions of the template.

There have been many attempts at producing reusable code for industrial controllers as well, but unfortunately the hardware of a typical industrial controller will not support more memory management tasks necessary for true object oriented languages. Further the wide range of applications of industrial processors makes it difficult to define standard reusable objects that would significantly increase programming productivity.

BRIEF SUMMARY OF THE INVENTION

The present invention provides relay ladder "objects" executable on an industrial controller and permitting rapid program development through code reusability. Objects are defined with respect to individual pieces of equipment to ensure generality for a variety of processes that use that particular piece of equipment. Limitations of the programmable controller in memory management are accommodated by pre-loading many instances of the objects into memory of the programmable logic. Individual instances are activated by an instance table in a separate computer which, by allowing interaction between the object and a control program in the separate standard computer, effectively "activate" the object instances. A particular I/O may be linked to activated objects through the use of a special mapping table also executed in relay ladder language.

The identification of the objects to particular pieces of equipment to handle intra-machine logic delegates to the programmable logic controller those tasks for which general computers are ill suited including processing of interlock and safety signals. Higher level control, where reliable availability is of less a concern, may then be handled by a standard computer using powerful program development tools such as scripting languages. Equipment-based objects shield the programmer of the standard computer from a need to understand idiosyncratic internal workings of different equipment from different manufacturers.

Specifically then, the present invention provides an industrial control system for controlling interconnected equipment of equipment types, the equipment having electrical sensors and actuators. The control system includes a programmable logic controller having I/O circuits communicating electrical signals with the actuators and sensors of the equipment and a relay ladder processing unit and a controller memory, all in communication. The controller memory holds multiple predefined relay ladder objects for different equipment types, the relay ladder objects having rungs with contacts representing signals from the sensors and the output coils representing signals to the actuators, the rungs joining the contacts and output coils to provide intra-machine control logically relating operation of the actuators and sensors.

The industrial control system also includes at least one general-purpose computer having a processing unit communicating with the computer memory. The computer memory holds an instancing table matching equipment with particular ones of the relay ladder objects having a matching equipment type. The memory also holds a stored control program executable by the processing unit to provide inter-machine control of the equipment, the control program logically coordinating operation of different interconnected equipment by exchanging data by the predefined relay ladder objects matched to the equipment by the instancing table.

Thus it is one object of the invention to provide object-type capabilities in a programmable logic controller. By pre-storing standardized objects in the controller memory, and linking them to a control program contained in the standard computer using the instancing table, the benefits of prewritten reusable code may be achieved in a programmable logic controller.

The I/O circuits associate the electrical signals of the actuators and sensors with unique I/O addresses in memory. Further the rungs and contacts of the relay ladder objects are associated with unique object addresses in memory. The invention may further include in the controller memory, a relay ladder mapper having series connected pairs of rungs and contacts relating an I/O address in memory to an object address in memory.

Thus it is another object of the invention to allow the relay ladder objects to be freely assigned to different I/O circuits despite the fact that they are prestored in memory. The relay ladder mapper allows the relay objects to have assigned physical addresses and yet to maintain flexibility with respect to their I/O assignment.

The rungs and contacts of the relay ladder objects may be associated with unique object addresses in memory and the controller memory may further include an instancing table identifying the relay ladder objects, their associated equipment types and their object addresses in memory.

Thus it is another object of the invention to permit some variation in the number and type of relay ladder objects preloaded into the programmable logic controller, such variations as may detected by the general purpose computer.

The predefined relay ladder objects may include logic for responding to an emergency stop command and/or for detecting a fault condition of the associated equipment and responding appropriately.

Thus it is another object of the invention to divide control task between two different computer architectures (e.g., programmable logic controller and standard computer) according to their particular strengths of each. The programmable logic controller undertakes the high reliability, low level control including providing emergency stop and the detection of fault conditions. The standard computer is thus freed to work at a higher level removed from the mechanics of the equipment.

In addition, the controller memory may include a monitoring relay ladder program checking for proper operation of the standard processor. The monitoring relay ladder program may communicate with the relay ladder objects to activate their fault conditions if their monitoring program indicates failure of the standard processor in executing the control program.

Thus it is another object of the invention to leverage the high reliability of a programmable logic controller to improve the reliability of the flexible general-purpose computer.

The invention may be used with more than one programmable logic controller each with multiple, predefined relay ladder objects. The instancing table may then match particular equipment with particular ones of the relay ladder objects in a designated one of the multiple programmable controllers. The stored control program logically coordinates operation of different interconnected equipment by exchanging data with the predefined relay ladder objects in a programmable controller designated for the equipment in the instancing table.

Thus it is another object of the invention to provide a simple method for coordinating multiple programmable logic controllers and thus to provide a completely scalable control system.

The foregoing and other objects and advantages of the invention will appear from the following description. In this description, reference is made to the accompanying drawings, which form a part hereof, and in which there is shown by way of illustration, a preferred embodiment of the invention. Such embodiment does not necessarily represent the full scope of the invention, however, and reference must be made therefore to the claims for interpreting the scope of the invention.

BRIEF DESCRIPTION OF THE DRAWINGS

FIG. 4 is a simplified cross-sectional view of the auger conveyor of FIG. 1 showing its input and output signals related to components of the auger conveyor;

FIG. 5 is a detailed view of an example relay ladder object for the conveyor of FIG. 4 as stored in memory of the programmable controller of FIG. 3;

FIG. 6 is a detailed view of an example of the relay ladder mapper suitable for use with the relay ladder object of FIG. 5;

FIG. 7 is a representation of the instancing table of FIG. 3 for the relay ladder objects of FIG. 3;

DETAILED DESCRIPTION OF THE INVENTION

Figure 1:
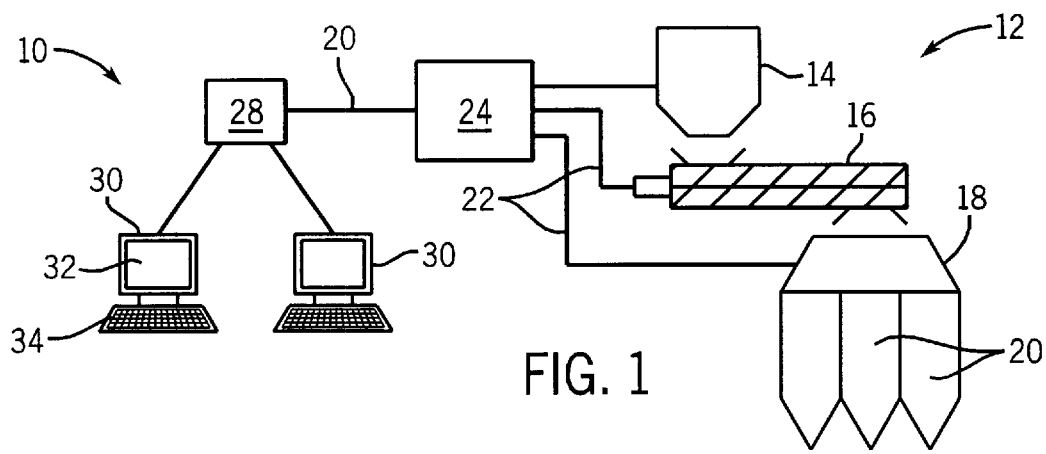
FIG. 1 is a simplified block diagram showing the principal components of the control system of the present invention including a standard computer system acting as a server for several terminals and a programmable logic controller communicating with an example industrial process having a hopper, an auger conveyor and a turnhead for filling different bins.

Referring now to FIG. 1, an industrial control system 10 per the present invention provides for the control of an industrial process 12, for example, one for the sorting of agricultural products and including a hopper 14 feeding an auger conveyor 16 transporting material from the hopper 14 to a turnhead 18 supplying one or more bins 20. Generally the equipment of the example industrial process 12 may be operated so as to provide a sorting of material from the hopper 14 into specific ones of the bins 20.

Each of the hopper 14, auger conveyor 16 and turnhead 18 have electrical actuators and sensors for the control of their operation, as will be described in more detail with respect to auger conveyor 16, and as is generally understood in the art.

Electrical leads 22 from these actuators and sensors are received by a one or more programmable logic controllers 24 such as are commercially available from the Allen-Bradley division of Rockwell Corporation and which provide specialized input/output circuits for communicating with the sensors and actuators and which may be programmed in relay ladder language or other well known control languages to provide for control of the industrial process 12.

The programmable logic controller 24 communicates, in turn, via a serial link 26, with a standard computer 28 such as may be a microprocessor-based "desk top" computer using a commercially available operating system such as Windows NT or the like available from the Microsoft Corporation.

The standard computer 28 may in turn communicate with one or more work stations 30 (also "desk top" type machines) which include graphical display screens 32 for the display of information and keyboards 34 or other input devices for the entry of data and the programming instructions.

Figure 2:
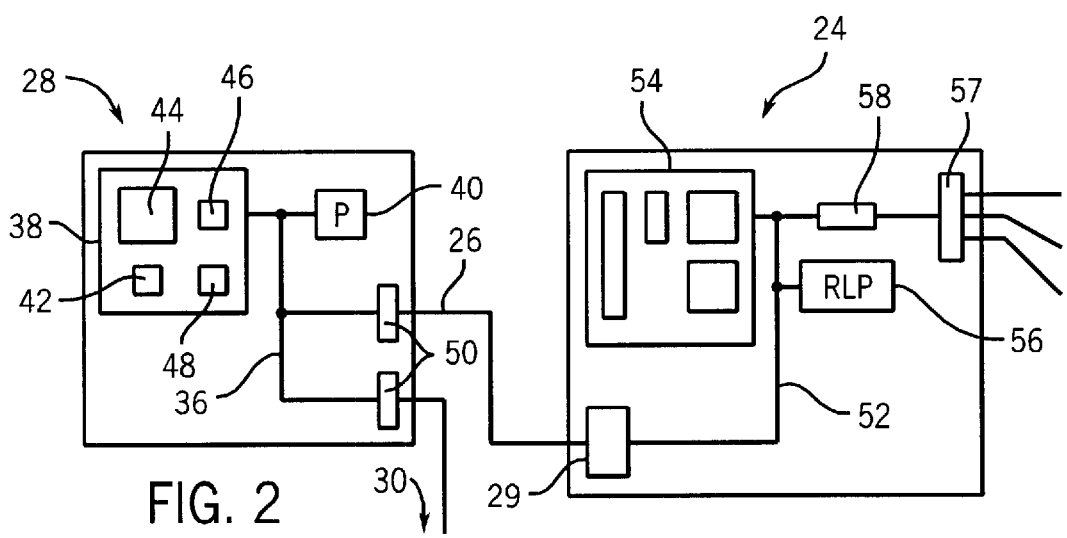
FIG. 2 is an expanded block diagram of the standard computer system and programmable logic controller of FIG. 1 showing internal components including a standard processor, a relay ladder processor and memories as connected by bus structures.

Referring now to FIG. 2, the standard computer 28 may have a conventional architecture in which an internal bus 36 connects a solid state memory 38 with a processor 40, such as a Pentium series microprocessor available from Intel Corporation, and which executes general arithmetic, logical and flow control instructions. The memory includes the operating system and server application programs 42 allowing communication with the programmable logic controller 24 and the work stations 30 and also control program 44 specially written for the industrial process 12 that provides for high level control of the operation of the industrial process 12. The internal bus 36 also communicates with one or more ports 50, one of which communicates via the serial link 26 with the programmable logic controller 24 and the other of which may communicate with the work stations 30 as described above.

The control program 44, executing on the standard computer 28, may be prepared using a sophisticated graphic scripting language such as Visual Basic also available from the Microsoft Corporation to provide rapid code development and a sophisticated graphical user interface. The control program 44 generally provides for inter-machine control, for example, starting or stopping the industrial process 12 by turning on or off various pieces of equipment in their correct order. Further, using commands or data input from the work stations 30, the control program 44 may route material from the hopper 14 to the correct bins 20 and may monitor the operation of the equipment providing graphical icons on the display screens 32 of the work stations 30 indicating operation of the industrial process 12.

Also included in the memory 38 for execution by the standard processor 40 is an updating program 46 and an instancing table 48 whose operation will be described below.

The programmable logic controller employs a similar internal architecture including an internal bus 52 connecting a memory 54 to a relay ladder processor 56, the latter being a specialized processor or a general processor and special software for rapid execution of relay ladder instructions.

The serial link 26 communicates with the internal bus 52 via serial port 29 to allow the reading and writing of portions of the memory 54 by the standard computer 28. A scanning module 58 also communicates with the internal bus 52 to allow an automatic updating of other portions of the memory 54 storing inputs from the industrial process 12 and outputs to the programmable logic controller 24 independently of execution of the programs of memory 54 by the relay ladder processor 56 as will be described.

Figure 3:
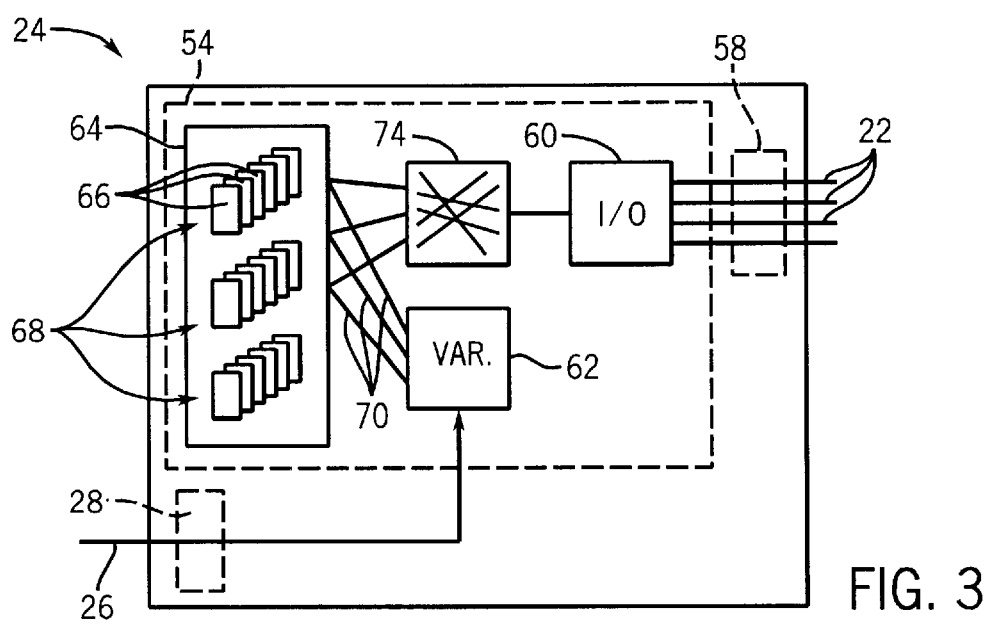
FIG. 3 is an expanded functional depiction of the programmable logic controller of FIG. 2 showing the structures of relay ladder objects, a relay ladder mapper and conventional variable storage as implemented in data and programs executed by the relay ladder processor and stored in the memory of FIG. 2.

Referring now to FIG. 3, the memory 54 includes both data and programs which when executed and operated on by the relay ladder processor 56 provide functional structures as depicted in FIG. 3. First, the memory 54 provides an I/O table 60, as is generally understood in the art, storing input and output data, from and too the industrial process 12 as represents the state of actuators and input values from the sensors. A variable table 62 contains variables that represent states not having a one-to-one relationship with an actual sensor or actuator signal and numeric constants or variables needed in the control process.

The memory 54 also holds a set 64 of prestored relay ladder objects 66. Each of the relay ladder objects 66 is associated with a particular type of equipment, for example, a hopper, an auger conveyor, or a turnhead. The relay ladder objects 66 are arranged in regular memory addresses by equipment ranks 68 according to their generic equipment types, each equipment type having multiple relay ladder objects 66. Although only three ranks 68 are shown and six "instances" of each relay ladder objects 66 in each rank 68, an arbitrarily large number of equipment types and instances may be represented in the memory.

Unlike conventional objects produced by an object-oriented language in which memory may be allocated on a dynamic basis to the objects as the objects are instanced, the relay ladder objects 66 are prestored in memory 54 so as to eliminate the need for dynamic memory management of a type not available under the robust operating system of the programmable logic controller 24. In other words, the memory space for each relay ladder object 66 is reserved at the time the programmable logic controller 24 is first programmed. It follows that there exists a predetermined static mapping between the relay ladder objects 66 and their associated variable space in the variable table 62 as indicated by lines 70.

In order to provide the flexibility necessary to use the programmable logic controller 24 for different programming applications (having different numbers and types of equipment), the type and number of the relay ladder objects 66 may be changed at the time of initial programming of the programmable logic controller 24. The particular configuration of the relay ladder objects and their mapping to associated variables of variable table 62 is recorded in an instancing table 48 held in the standard computer 28. This allows different types of equipment ranks 68 in the programmable logic controller 24. Generally, however, the programmable logic controller is preconfigured with a standard set of relay ladder objects 66 with sufficient extra relay ladder objects 66 of each type to accommodate most programming applications at least for a specific industry. Only those objects that are necessary for a particular application are activated.

While the relay ladder object 66 may also have the fixed mapping to I/O space representing actual circuits communicating with the industrial process 12, the goal of having an excess number of relay ladder objects 66 to accommodate an arbitrary control application would necessitate a large number of surplus I/O addresses creating an impractical cost burden on using pre-stored relay ladder objects, particularly in a programmable logic controller where I/O addresses are associated with fixed physical hardware. Accordingly, the present invention provides for remapping of given relay ladder objects 66 to I/O addresses through the use of a relay ladder mapper section 74 implemented entirely in relay ladder language and thus compatible with the operation of a programmable controller. This relay ladder mapper section 74 will be described in more detail below but generally converts the predetermined output and input addresses associated with the given relay ladder objects 66 to ones of a smaller subset of particular I/O addresses. The mapper section 74 may be quickly programmed manually upon installation of the programmable logic controller 24 once the necessary I/O addresses have been established and represents a considerable savings in time over the need to program the entire programmable logic controller 24 with custom developed logic.

The relay ladder objects 66 work in conjunction with a control program 44 in the standard computer 28 to simplify development of a control program. As will be explained further below, the pre-stored relay ladder objects 66 are used by the control program 44 of the standard computer 28 by means of data communicated over serial link 26 to and from the variable table 62 associated with the particular objects to effectively activate those relay ladder objects 66.

Referring now to FIG. 4, operation of the relay ladder objects 66 and the mapper section 74 will be described with respect to a simplified auger conveyor 16.

Generally, the conveyor 16 includes an input hopper 76 communicating along an axial tube 78 to an output hopper 80. Within the axial tube 78 is an Archimedean screw 82 whose rotation carries material from the input hopper 76 to the output hopper 80. Screw 82 is attached to a motor 84 receiving a signal (PWR) turning the motor on and off. Attached to the motor 84 is an operation sensor 86 detecting either motion of the motor 84 or proper movement of the material within the auger conveyor 16. The purpose of the operation sensor 86 is to detect jams or conveyor failures. The operation sensor 86 provides an output signal (MOV) indicating proper movement.

A local control panel 88 is associated with the auger conveyor 16 and includes an emergency stop button 89 providing a stop signal (ES) and an indicator light 90 providing a light signal if the auger is correctly operating as determined by an input light signal (OK).

Referring now to FIG. 5, an example relay ladder object 66 for the conveyor 16 may be written using standard relay ladder language in which virtual contacts and virtual output coils are arranged as graphical elements in rungs across virtual power rails to provide the logic that would be provided by physical rungs of the same topology. The relay ladder object 66 is duplicated many times within the memory 54 of the programmable logic controller 24 for use in applications where auger conveyor 16 exists. Such a relay ladder object 66 in each of its instances provides for the same logic but uses different variables. Thus, for the example to be described, variable V1–V6 are used to represent input and output values for a first relay ladder object 66 whereas for a second relay ladder logic, the identical instructions (rungs) are stored but referenced with different variable values V7–V12.

Referring momentarily also to FIG. 6, the fixed variables of the relay ladder object 66 may be connected to I/O circuits by a mapper section 74 which consists of a set of relay ladder rungs, as described above, comprised of pairs of contacts 92 and output coils 94 spanning power rails 96. As is understood in the art, the contacts 92 and output coils 94 operate as virtual contacts and outputs when wired in series. Thus when the variable associated with a contact 92 is set (e.g. a logical true or Boolean one) indicating closure of normally open contacts, the output coil 94 will be energized. The simple structure of the mapper section 74 provides a conversion between variables and actual I/O points. Thus for example, a variable V1 contained in variable table 62 when activated creates an output signal PWR as described above with respect to FIG. 4. Likewise, when variable V2 is activated, the OK signal of FIG. 4 is activated. The reverse mapping may also occur when the emergency switch is pressed creating an ES signal, the variable V3 is set in variable table 62 and when the move signal is present as received, variable V4 is set. Variables V5 and V6 as will be seen have no I/O association.

Referring now again to FIG. 5, the control program 44 of the standard computer 28 may activate the auger conveyor 16 without regard to its internal operation or hardware configuration by providing a single RUN signal implemented as a writing to variable V5 over serial link 26. As will be seen from the second and last rung of the relay ladder object 66, if the RUN signal is present and there is no FAULT as indicated by variable V6 and there is no emergency stop button pressed (ES) as indicated by variable V3, then the power signal (PWR) to the motor 84 is activated and the OK signal to the indicator light 90 is activated in a straightforward manner. Thus the programmer of the control program 44 of the standard computer 28 need not be concerned with the operation of the FAULT and emergency stop (ES) signals nor with illuminating the indicator light 90.

Looking now at the first rung of the relay ladder objects 66, if the RUN signal of V5 is activated by the standard computer 28 and there is no MOV signal from the operation sensor 86 as will occur for a brief period of time after the motor 84 is activated as a result of mechanical characteristics of the auger conveyor 16, a timer (TIMER 1) will be activated. Timers are also well known instructions used in relay ladder programming.

The timer may be preprogrammed with the amount of lag time expected between operation of the motor 84 and ability to sense movement by operation sensor 86. If the timer "times out" prior to movement occurring as indicated by variable V4 and its normally closed contact, then the done signal from the timer will cause activation of the fault variable V6 indicating that there is a plugging of the conveyor or failure of another kind.

While this is a simplified example, it illustrates the principles of the invention and from this example, it can be seen that great leverage is provided to programmers of control program 44 who is freed from low level programming tasks by use of relay ladder objects 66 that are prestored in the programmable logic controller 24. Further it will be seen that critical tasks such as fault detection and emergency stop may be handled entirely by the more robust and reliable programmable logic controller 24 and thus are removed from the often unstable platform of higher powered standard computers 28.

The limitations of programmable logic controller 24 in memory management such as would prevent normal instancing operation are overcome by pre-storing the relay ladder objects 66 in memory 54 and allowing their remapping with the mapper section 74.

As mentioned above as a practical matter, some flexibility will be wanted in which and how many and what kind of relay ladder objects 66 are prestored in memory and this variation may be accommodated by the instancing table 48.

Referring now to FIG. 7 as mentioned, each relay ladder object 66 maps to a different set of variables, for example, the first conveyor relay ladder object 66 mapping the variables V1 through V6 and the second conveyor relay ladder object 66 mapping to variables V7 through V12. This mapping and the type of the relay ladder objects 66 can be determined by interrogation of the instancing table 48 by standard computer 28. Thus when the control program 44 is assigned to particular relay ladder objects 66, those relay ladder objects 66 can be verified and their use tallied. The instancing table 48 includes therefore a listing of assigned address spaces 100 associated with equipment types 102 of the relay ladder objects 66. An entry in the instancing table indicates whether the particular instance of a relay ladder objects 66 is being used or not. The address spaces 100 may also include a portion designating a particular programmable logic controller 24 when multiple programmable logic controllers 24 are used in a given application. The standard computer 28 and the instancing table 48 thus provide a simple method of coordinating the operation of more than one programmable logic controller 24 (connected together on serial link 26) providing a truly scalable system for an arbitrary number of programmable logic controllers 24 usable with at least one standard computer 28.

Figure 9:
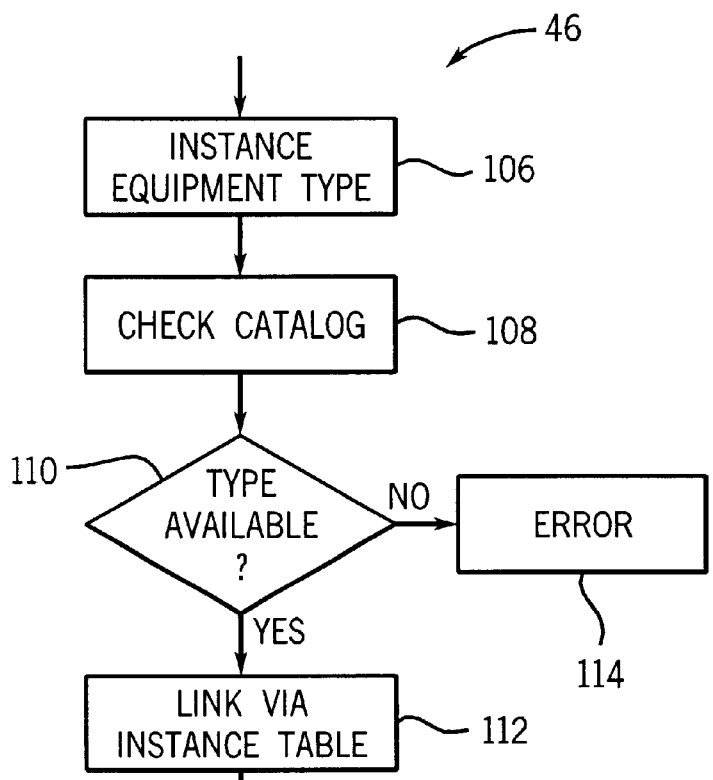
FIG. 9 is a flow chart showing execution of an updating program executed by the standard processor for modifying the instancing table in the programmable logic controller.

Referring now to FIG. 9, the updating program 46 is invoked by the control program 44 when it is necessary to attach a logical control element of the control program 44 (for example, a graphic animation of the auger conveyor 16 and its control logic with respect to the other equipment of the industrial process 12) to an actual auger conveyor 16. The control element may be represented by conventional software objects, which are instanced as indicated by process block 106. Upon such an instancing, the updating program 46 checks the instancing table 48 at process block 108. At decision block 110, if a relay ladder object 66 for the needed equipment type is available for the particular instanced control element, then the address spaces 100 of the variables associated with the relay ladder object 66 having equipment type 102 in the instancing table 48 are assigned to the control element as indicated by process block 112. If a relay ladder object 66 of the correct type is not available, an error condition occurs as indicated by process block 114.

Figure 8:
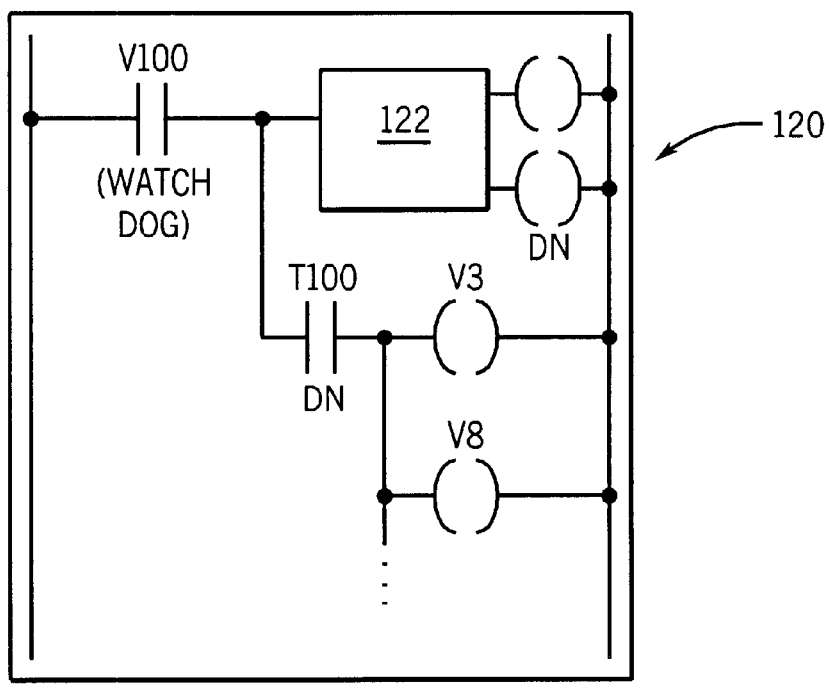
FIG. 8 is a detailed representation of a monitoring relay ladder program suitable for use in monitoring operation of the standard processor of FIG. 1.

Referring now to FIG. 8, the high reliability of the programmable logic controller 24 provides an opportunity to monitor the operation of the control program 44 and the standard computer 28 against lockups and crashes typical of these machines. This is most simply done by establishing a point in the control program 44, which regularly sets and resets an arbitrary variable (e.g., V100) located in the variable table 62. A monitoring relay ladder object 120 may connect the variable V100 to a watchdog timer element 122 and if V100 is not reset at a sufficient interval less than the watchdog timer interval, a timeout contact would close preconnected to each of the FAULT variables of the relay ladder object 66. Because the relay ladder object 66 have been prestored in the programmable logic controller 24, these addresses have been previously resolved and no custom programming is necessary to implement this feature in the programmable logic controller.

A failure of the control program 44 being executed on the standard computer 28 thus causes a faulting of each of the relay ladder objects 66 for each piece of equipment. The specific relay ladder objects 66 may on an individual basis determine the correct fault state for the device and make the necessary low level control signals to the device under such fault conditions.

It is specifically intended that the present invention not be limited to the embodiments and illustrations contained herein, but modified forms of those embodiments including portions of the embodiments and combinations of elements of different embodiments as come within the scope of the following claims.

I claim:

1. An industrial control system for controlling interconnected equipment of equipment types, the equipment having electrical sensors and actuators, the control system comprising:
   (a) a programmable logic controller including:
      (i) I/O circuits communicating electrical signals with the actuators and sensors of the equipment;
      (ii) a relay ladder processing unit; and
      (iii) a controller memory holding multiple, predefined relay ladder objects for different equipment types, the relay ladder objects having rungs with contacts representing signals from the sensors and output coils representing signals to the actuators, the rungs joining the contacts and output coils to provide intra-machine control logically relating operation of the actuators and sensors;
   (b) at least one general purpose computer including:
      (i) a processing unit and
      (ii) a computer memory, the memory holding:
         (1) an instancing table matching particular equipment with particular ones of the relay ladder objects having matching equipment types;
         (2) a stored control program executable by the processing unit to provide inter-machine control of the equipment, the control program logically coordinating operation of different interconnected equipment by exchanging data with the predefined relay ladder objects according to the instancing table; whereby a writing of control programs may be simplified by using predefined relay ladder objects for intra-machine control.

2. The industrial control system of claim 1 wherein:
the I/O circuits associate the electrical signals communicated with the actuators and sensors of the equipment to unique I/O addresses in memory; and wherein
the rungs and contacts of the relay ladder objects are associated with unique object addresses in memory; and wherein
the controller memory further includes a relay ladder mapper having series connected pairs of rungs and contacts relating an I/O address in memory to an object address in memory;
whereby the predefined relay ladder objects may be freely connected to equipment of comparable types with arbitrary I/O addresses.

3. The industrial control system of claim 1 wherein the predefined relay ladder object includes logic for responding to an emergency stop command for the associated equipment by changing a state of at least one output coil.

4. The industrial control system of claim 1 wherein the rungs of the predefined relay ladder objects also have non I/O contacts and non I/O output coils representing control states that are logical combinations of the signals of the sensors and actuators, and wherein the control program exchanges data with the predefined relay ladder objects through the non I/O contacts and non I/O output coils.

5. The industrial control system of claim 4 wherein the predefined relay ladder objects include logic for detection of a fault condition of the associated equipment and upon such a detection change the state of a fault non I/O output coil.

6. The industrial control system of claim 5 wherein the predefined relay ladder object includes logic for responding to a fault condition for the associated equipment by changing a state of at least one output coil to stop operation of the equipment.

7. The industrial control system of claim 6 wherein the predefined relay ladder object includes logic for responding to a fault condition for the associated equipment detected by the predefined relay ladder object.

8. The industrial control system of claim 6 wherein the controller memory includes a monitoring relay ladder program checking for proper operation of the general purpose computer in executing the control program on the general purpose computer, the monitoring relay ladder program communicating with the relay ladder objects to invoke their fault conditions if the monitoring program indicates failure of the general purpose computer in executing the control program.

9. The industrial control system of claim 1 including further:
  a second programmable logic controller having:
    (i) second I/O circuits communicating electrical signals with the actuators and sensors of the equipment;
    (ii) a second relay ladder processing unit; and
    (iii) a second controller memory holding multiple, predefined relay ladder objects for different equipment types, the relay ladder objects having rungs with contacts representing signals from the sensors and output coils representing signals to the actuators, the rungs joining the contacts and output coils to provide intra-machine control logically relating operation of the actuators and sensors;
  and wherein the instancing table matches particular equipment with particular ones of the relay ladder objects in a designated one of the two programmable controllers;
  and wherein the stored control program logically coordinates operation of different interconnected equipment by exchanging data with the predefined relay ladder objects in a programmable controller designated for the equipment in the instancing table.

10. A method of industrial control of interconnected equipment of equipment types, the equipment having electrical sensors and actuators, the method using: a programmable logic controller including: I/O circuits communicating electrical signals with the actuators and sensors of the equipment; a relay ladder processing unit; and a controller memory; the method further using at least one general purpose computer including: a processing unit and a computer memory, the method comprising the steps of:
  (a) storing in the controller memory multiple, predefined relay ladder objects for different equipment types, the relay ladder objects having rungs with contacts representing signals from the sensors and output coils representing signals to the actuators, the rungs joining the contacts and output coils to provide when executed by the relay ladder processor intra-machine control logically relating operation of the actuators and sensors;
  (b) storing in the computer memory an instancing table matching particular equipment with particular ones of the relay ladder objects having matching equipment types; and
  (c) preparing a control program executable by the processing unit to provide intermachine control of the equipment by exchanging data with the predefined relay ladder objects according to the instancing table.

11. The method of claim 10 wherein:
  the I/O circuits associate the electrical signals communicated with the actuators and sensors of the equipment to unique I/O addresses in memory; and wherein
  the rungs and contacts of the relay ladder objects are associated with unique object addresses in memory;
  and including the further step of:
  loading in the controller memory a relay ladder mapper having series connected pairs of rungs and contacts relating an I/O address in memory to an object address in memory;
  whereby the predefined relay ladder objects may be freely connected to equipment of comparable type with arbitrary I/O addresses.

12. The method of claim 10 wherein the predefined relay ladder object includes logic for responding to an emergency stop command for the associated equipment by changing a state of at least one output coil.

13. The method of claim 10 wherein the rungs of the predefined relay ladder objects also have non I/O contacts and non I/O output coils representing control states that are logical combinations of the signals of the sensors and actuators, and including the further step of exchanging data with the predefined relay ladder objects through the non I/O contacts and non I/O output coils.

14. The method of claim 10 wherein the predefined relay ladder objects include logic for detection of a fault condition of the associated equipment and including the step of changing the state of a fault non I/O output coil upon such a detection.

15. The method of claim 10 wherein the predefined relay ladder object includes logic for responding to a fault condition for the associated equipment by changing a state of at least one output coil to stop operation of the equipment.

16. The method of claim 10 wherein the predefined relay ladder object includes logic for responding to a fault condition for the associated equipment detected by the predefined relay ladder object.

17. The method of claim 10 including the step of checking for proper operation of the general purpose computer in using a monitoring relay ladder program, the monitoring relay ladder program communicating with the relay ladder objects to invoke their fault conditions if the monitoring program indicates failure of the general purpose computer in executing the control program.

18. The method of claim 10 including the further steps of:
  storing in a memory of a second programmable controller multiple, predefined relay ladder objects for different equipment types, the relay ladder objects having rungs with contacts representing signals from the sensors and output coils representing signals to the actuators, the rungs joining the contacts and output coils to provide intra-machine control logically relating operation of the actuators and sensors;
  storing in the instancing table an indication of one of the two programmable logic controllers having relay ladder objects matching particular equipment; and
  preparing the control program to provide inter-machine control of the equipment by exchanging data with the predefined relay ladder objects in a programmable controller designated by the instancing table.

* * * * *